(12) United States Patent
Marioni

(10) Patent No.: US 7,576,510 B2
(45) Date of Patent: Aug. 18, 2009

(54) CONTROL METHOD FOR A SYNCHRONOUS MOTOR, PARTICULARLY FOR CIRCULATION PUMPS

(75) Inventor: Elio Marioni, Dueville (IT)

(73) Assignee: Askoll Holding S.r.l. (IT)

( * ) Notice: Subject to any disclaimer, the term of this patent is extended or adjusted under 35 U.S.C. 154(b) by 173 days.

(21) Appl. No.: 10/562,111

(22) PCT Filed: Jun. 24, 2004

(86) PCT No.: PCT/EP2004/006842

§ 371 (c)(1),
(2), (4) Date: Feb. 6, 2007

(87) PCT Pub. No.: WO2004/114514

PCT Pub. Date: Dec. 29, 2004

(65) Prior Publication Data

US 2007/0126390 A1   Jun. 7, 2007

(30) Foreign Application Priority Data

Jun. 24, 2003   (EP)   ................................. 03425409

(51) Int. Cl.
H02P 3/18   (2006.01)
(52) U.S. Cl. .................. 318/717; 318/727; 318/807
(58) Field of Classification Search .................. 318/17, 318/430, 727, 801, 807; 363/39, 44
See application file for complete search history.

(56) References Cited

U.S. PATENT DOCUMENTS

| | | | |
|---|---|---|---|
| 6,362,585 B1 * | 3/2002 | Hiti et al. .................... | 318/430 |
| 6,839,653 B2 * | 1/2005 | Gerlach ....................... | 702/151 |
| 7,005,825 B2 * | 2/2006 | Eguchi ........................ | 318/727 |
| 7,355,865 B2 * | 4/2008 | Royak et al. .................. | 363/44 |
| 7,355,866 B2 * | 4/2008 | Hsieh et al. ................... | 363/50 |
| 2003/0034749 A1 | 2/2003 | Zinke et al. | |
| 2004/0095789 A1 * | 5/2004 | Li et al. ....................... | 363/132 |
| 2005/0218864 A1 * | 10/2005 | Eguchi ........................ | 318/807 |
| 2006/0187683 A1 * | 8/2006 | Hsieh et al. ................... | 363/10 |
| 2006/0208687 A1 * | 9/2006 | Takeoka et al. ............. | 318/801 |
| 2007/0085526 A1 * | 4/2007 | Baker .......................... | 324/86 |
| 2008/0084716 A1 * | 4/2008 | Ganev et al. .................. | 363/39 |

FOREIGN PATENT DOCUMENTS

| | | |
|---|---|---|
| EP | 1 105 961 | 6/2001 |
| EP | 1 281 229 B1 | 2/2003 |
| JP | 03 139196 A | 6/1991 |
| JP | 2002 017096 A | 1/2002 |

\* cited by examiner

*Primary Examiner*—Paul Ip
(74) *Attorney, Agent, or Firm*—Akerman Senterfitt

(57) ABSTRACT

The present invention relates to a control method for a synchronous electric motor with permanent-magnet rotor, particularly for fluid circulation pumps in conditioning systems and/or household appliances, wherein the application of predetermined voltage values to each of the windings (L1, L2) of the motor is provided, by means of a converter control circuit (10). The method provides a continuous measure of the amplitude of the bus ($V_r$) ripple and a comparison with a reference value, for example with respect to an average bus voltage level. According to the comparison result the motor is driven by means of a variation of the winding voltage having an sinusoidal wave form.

5 Claims, 6 Drawing Sheets

CONTROL METHOD FOR A SYNCHRONOUS MOTOR, PARTICULARLY FOR CIRCULATION PUMPS

FIELD OF APPLICATION

The present invention relates, in its more general aspect, to a synchronous electric motor particularly, but not exclusively, indicated for fluid circulation pumps in conditioning systems and/or household appliances.

In particular, this invention relates to a method for controlling a synchronous electric motor of the type comprising a permanent-magnet rotor.

PRIOR ART

It is well known to the skilled in the art that fluid circulation pumps mounted in heating and/or conditioning plants or systems are commonly called circulators.

The present circulator production is almost completely carried out with asynchronous motors. Only recently circulators, manufactured with the technology of the permanent-magnet-rotor synchronous motor, start becoming commercially successful.

Also washing machines are equipped with circulators, i.e. a circulation pump to let the washing water circulate inside the machine.

Normally, this pump is rotation-driven by asynchronous electric motors with winding and phase fragmentation which causes an imperfect and not constant speed variation and which produces acoustic and electrical noise, i.e. vibrations due to ventilation and electromechanical unbalances.

In washing machines solutions providing the use of permanent-magnet synchronous motors comprising a rotor housed inside a sleeve, wherein the circulation water permeates, are also known. This solution has the advantage that it does not require an tightness between the rotor and the water circuit.

Nevertheless, synchronous motors have the problem that they cannot be started independently because of the need to overcome a predetermined moment of inertia, particularly when they are coupled to the load.

The prior art provides several solutions to solve this drawback. Some solutions provide a mechanical uncoupling between the rotor and the load during the initial starting transient, other solutions provide complex electronic control circuits to adjust the rotor acceleration until synchronism is reached.

The guidelines to produce a circulation pump driven by a synchronous motor and being reliable, long average life and having convenient production costs for uses in conditioning systems or household appliances produced on large scale, make it indispensable to drive the synchronous motor in a particularly efficient way, especially in the critical operating conditions of load variation, i.e. sudden variations in the pump flow rate and which can also cause a motor shutdown.

A known technical solution to try and meet this requirement is described in the US patent application published with no. 2003/0034749 describing a driving circuit for a dishwashing machine pump for which the application of a sequence of variable pulses is suggested, which provide the motor with a variable average voltage and consequently affect the rotation speed.

Substantially, this solution provides an indirect control of the motor rotation speed.

Although advantageous under several aspects, this solution cannot be completely efficiently exploited in case of sudden load variations or possible motor shutdown conditions. Moreover it is noisy itself because of the cogging torque which is typical of BLDC motors.

The technical problem underlying the present invention is to provide a method for controlling a permanent-magnet synchronous electric motor, particularly for fluid circulation pumps in conditioning systems and/or household appliances, allowing all the drawbacks mentioned with reference to the prior art to be overcome in a simple and economical way. In particular this control method must ensure a considerable operating silentness at all motor operation speeds, minimising in the meantime the power absorbed and solving possible critical situations of load variations which might stall the synchronous motor.

SUMMARY OF THE INVENTION

This technical problem is solved according to the present invention by a method for controlling a synchronous electric motor as defined in claim 1.

The features and advantages of the method for controlling the synchronous electric motor according to the invention will be apparent from the following description of an embodiment thereof with reference to the attached drawings given by way of non-limiting example.

DETAILED DESCRIPTION OF A PREFERRED EMBODIMENT

Figure 2:
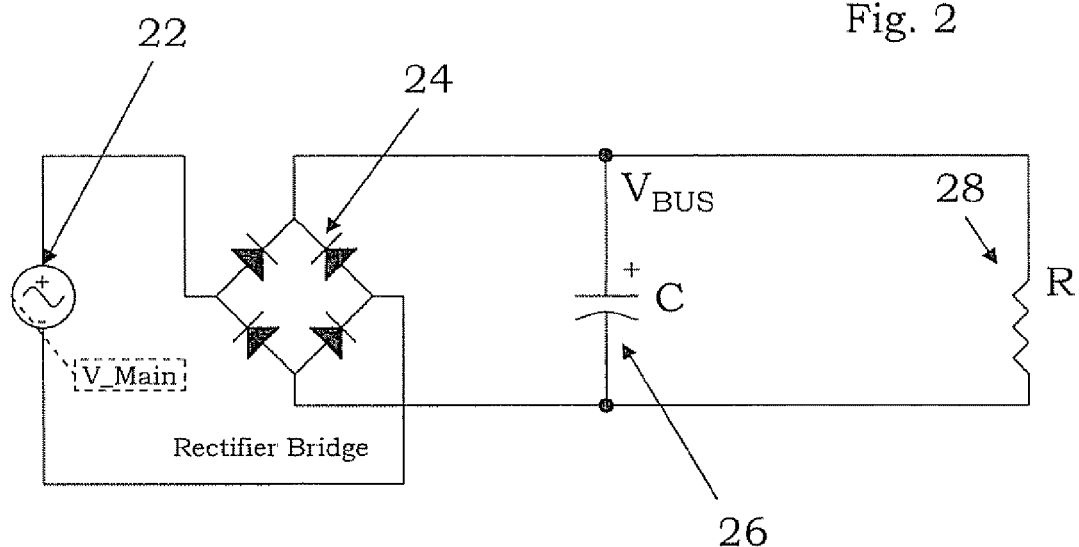
FIG. 2 schematically shows a power regulation circuit incorporated in a known control circuit for a synchronous electric motor.
Figure 1:
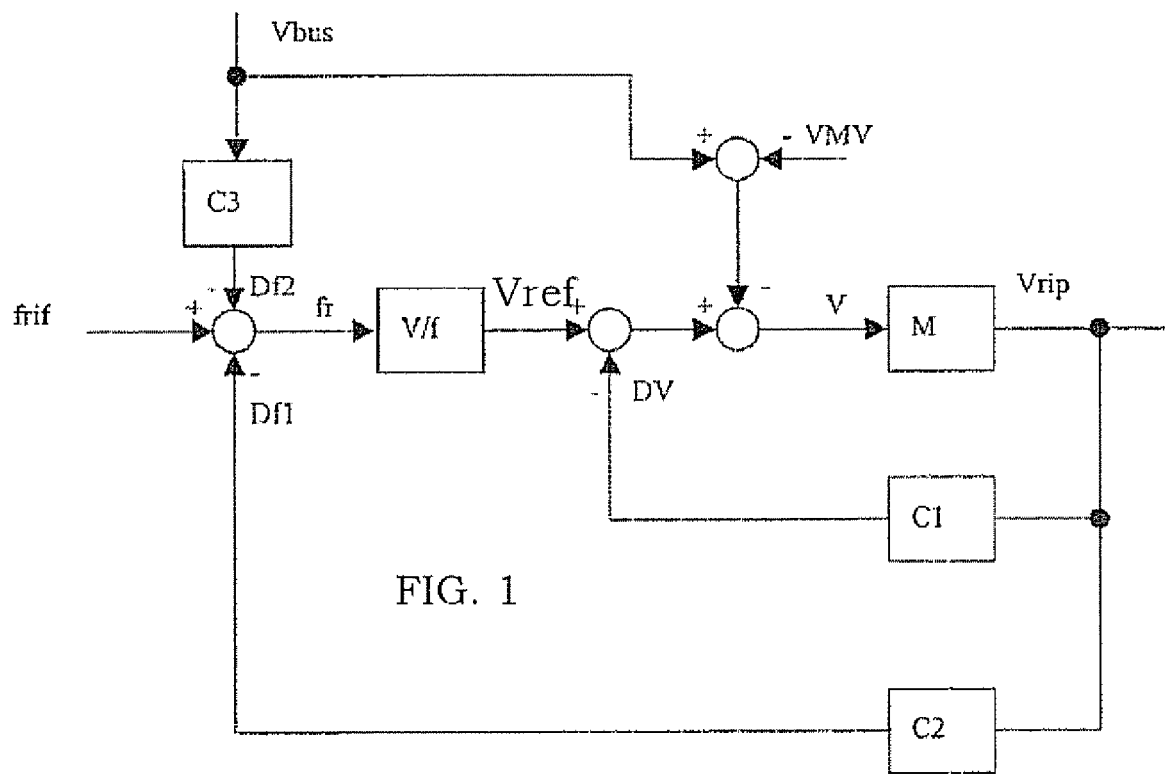
FIG. 1 is a schematic view of functional block showing the method for controlling a synchronous electric motor according to the present invention.

With initial reference to FIGS. 1 and 2, a control circuit is shown, globally indicated with 10, and manufactured according to the invention for a permanent-magnet synchronous electric motor, particularly for fluid circulation pumps in conditioning systems and/or household appliances such as washing machines and the like.

More precisely, the control converter circuit 10 comprises a power regulation circuit 20 and a current regulation circuit 30.

The kind of control adopted for the power regulation circuit 20 is of the adaptive type, since the voltage applied to the synchronous electric motor windings is adapted to the load and line voltage conditions in order to obtain the lowest absorbed power value.

Advantageously, the absorbed power estimate is based on the largest amplitude of the so-called "ripple", i.e. on the largest oscillation amplitude in the bus voltage Vr.

FIG. 1 schematically represents a rectifier circuit connected to a load R. A power supply 22, derived from a power supply line, for example a 220-230V AC mains power supply, is applied to opposite terminals of a diode-bridge rectifier 24 having the output terminals connected to the opposite terminals of a capacitor 26.

A resistance 28 representing the equivalent load is in parallel with the capacitor 26.

The amplitude of the current absorbed by the load is determined by the value of the resistance 28 (which is equivalent to the simulated load). As it is known, voltage variations at the capacitors' terminals, and particularly the slopes thereof, depend on the value of this current.

In high load conditions, i.e. in high absorbed current conditions and with a low simulated resistance 28, very marked slopes are detected in the capacitor discharge voltage and, consequently, minimum values on the bus voltage.

This determines an increase of the highest amplitude of the ripple in the bus voltage, i.e. the difference between the highest value and the lowest value through which capacitors succeed in charging.

The ripple of the bus voltage $V_r$ is proportional to the current $I_{dc}$ that flows, as described by the following known relations.

For very high capacitance C values, the voltage exponential reduction may be considered having a linear path. If we indicate with Vr (ripple) the total discharge voltage value of the capacitor 26, we may obtain express Vr as a function of the load current and the capacitance C.

In this respect, it must be considered the whole time period Td of non conduction wherein the capacitance looses a charge quantity given by Idc Td, for a constant discharge current Idc.

Thus, the variation of the voltage on the capacitor 26 is given by:

$$Vr=(Idc\ Td)/C$$

If we consider that the period Td corresponds more or less to a semi-period of the supply voltage, we may use the following relation: Td=T/2=½f where f is the frequency of the AC supply voltage. Thus the final relation between the voltage Vr and the discharge current Idc is given by:

$$V_r=I_{dc}/2fC$$

with the due prior art approximations, and where C is the capacitance of the capacitor 26 and f is the supply voltage frequency.

Replacing now the resistance R used in FIG. 1 with an inverting stage supplying the motor, it can be noticed that the current $I_{dc}$ flowing from the bus capacitor 26 towards the inverter is only an active current and it is proportional to the active power absorbed by the motor.

This current $I_{dc}$ is proportional to the ripple value of the bus voltage $V_r$ which is in turn proportional to the active absorbed power: the regulation of the voltage provided to the motor can be thus performed according to the active power absorbed therefrom.

It is now worth making an energy balance of the system represented by the synchronous motor and the relevant control circuit 10. The energy absorbed by this system can be substantially split as follows:

energy dissipated on motor windings because of Joule effect, magnetic energy stored in the system, mechanical energy and various losses.

The energy dissipated on the windings is of the resistive type and thus directly proportional to the voltage supplied to the same windings less the back electromotive force (BEMF). A decrease of this energy causes a decrease of the dissipation caused by the Joule effect and thus of the absorbed current.

However, the voltage decrease in order to reduce the absorbed power has a limitation: to ensure the desired level of mechanical energy and considering the inevitable losses associated thereto, a minimum voltage is required. Under this minimum voltage value the current has a natural tendency to increase.

This behaviour is also due to the electro-physical behaviour of the synchronous motor concerned; in fact there is an optimum operation point (optimum excitation) wherein the motor absorbs the lowest current, this situation can be represented with parabolic curves already identified in literature.

A known diagram reporting the absorbed current of the synchronous motor versus the back electromotive force (BEMF) shows various curves having a "V" shape with a minimum bottom value. An ideal line connection all those minimum values for the different curves represents a line wherein $\cos \phi = 1$.

It results that these characteristic curves have a minimum also corresponding to a minimum in the ripple amplitude of the bus voltage $V_r$.

The adaptive control method according to the invention, implemented by means of the circuit 10, operates interactively with the following steps:

measure of ripple amplitude of the bus $V_r$;

estimate of the voltage variation type (positive or negative) causing a decrease of the absorbed current;

voltage variation on the windings on the basis of the previous estimate.

The voltage variations applied to the windings must be very limited in each iteration step since too high variations cause the system instability and peaks in windings' currents.

The adjustment to the minimum absorbed power is thus very important to let the system operate with the highest possible efficiency, this is obtained according to the invention at the technologically highest possible levels by using the synchronous motor.

In a preferred embodiment of the method according to the invention, the voltage applied to the windings advantageously has a sinusoidal wave form.

Now, with particular reference to the example of FIG. 1, the block diagram shows the steps of the inventive method referring to an initial state wherein a reference working frequency frif is applied from outside.

This frequency value is applied to an adder block 11 receiving also with a negative sign the output value Df2 of a control block C3 for modulating the voltage value to supply to the motor. This block C3 receives as input the Vbus voltage value.

The output of the adder block 11 is a frequency value fr corresponding to the real working frequency which is used in a subsequent block 12 to compute the a voltage reference Vref obtained as V/f, where V is the real voltage value applied to the motor and f is the frequency of the supply voltage.

A further adder block 13 receives the output of the block 12 and a feedback output DV of a control block C1 that is provided for modulating the power of the motor.

The motor is identified by the block M from which the ripple voltage Vr is obtained. Such a voltage Vr is applied as input to the control block C1 and to a further control block C2 that is provided for a load modulation.

The out put of the block C1 is applied to the adder 13 to be subtracted to the output of the block 12.

The output of this adder block 13 is applied to another adder block 14 receiving also with negative sign the difference value between the voltage Vbus and the voltage VMV which is the centre bridge voltage. The output of this last adder block 14 is a voltage value V applied to the motor M.

The output Df1 of the load modulation block C2 is feedback returned to the first adder block 11 to be subtracted for obtaining the real frequency value fr.

Figure 3:
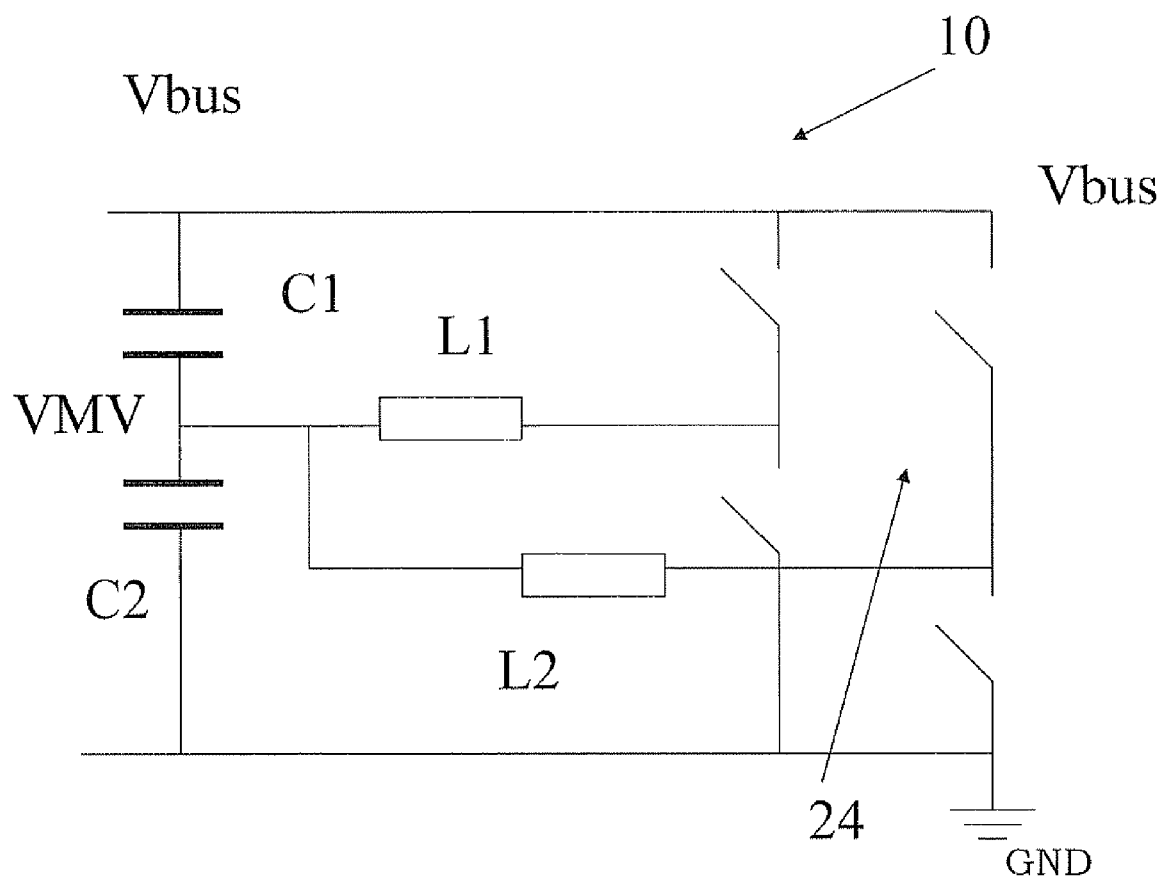
FIG. 3 schematically shows a power regulation circuit incorporated in a control circuit according to the invention for a synchronous electric motor.
Figure 4:
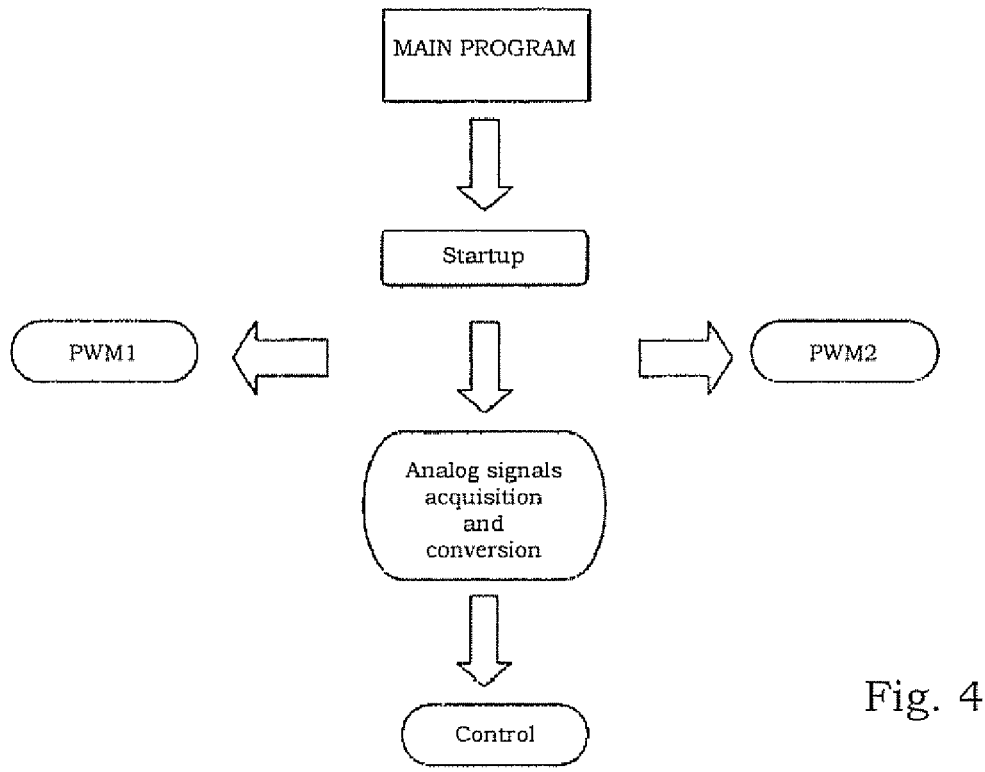
FIG. 4 is a general flowchart showing a method for controlling a synchronous electric motor according to the present invention.
Figure 6:
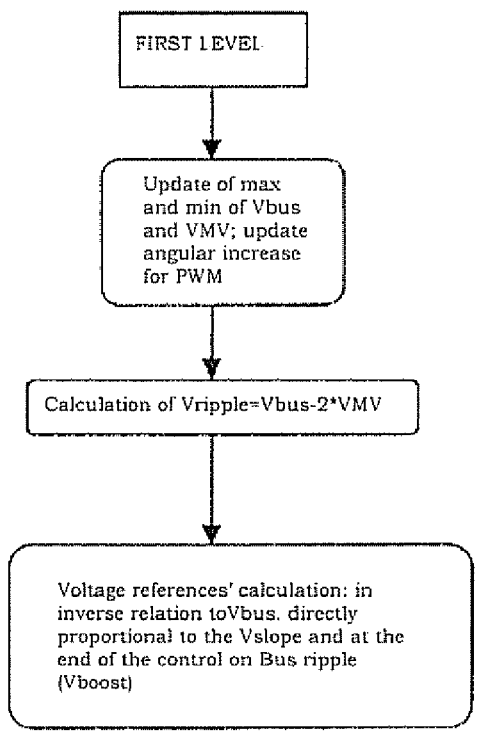
FIG. 6 is a block diagram showing some operative steps of a detail of the flowchart of FIG. 5.
Figure 5:
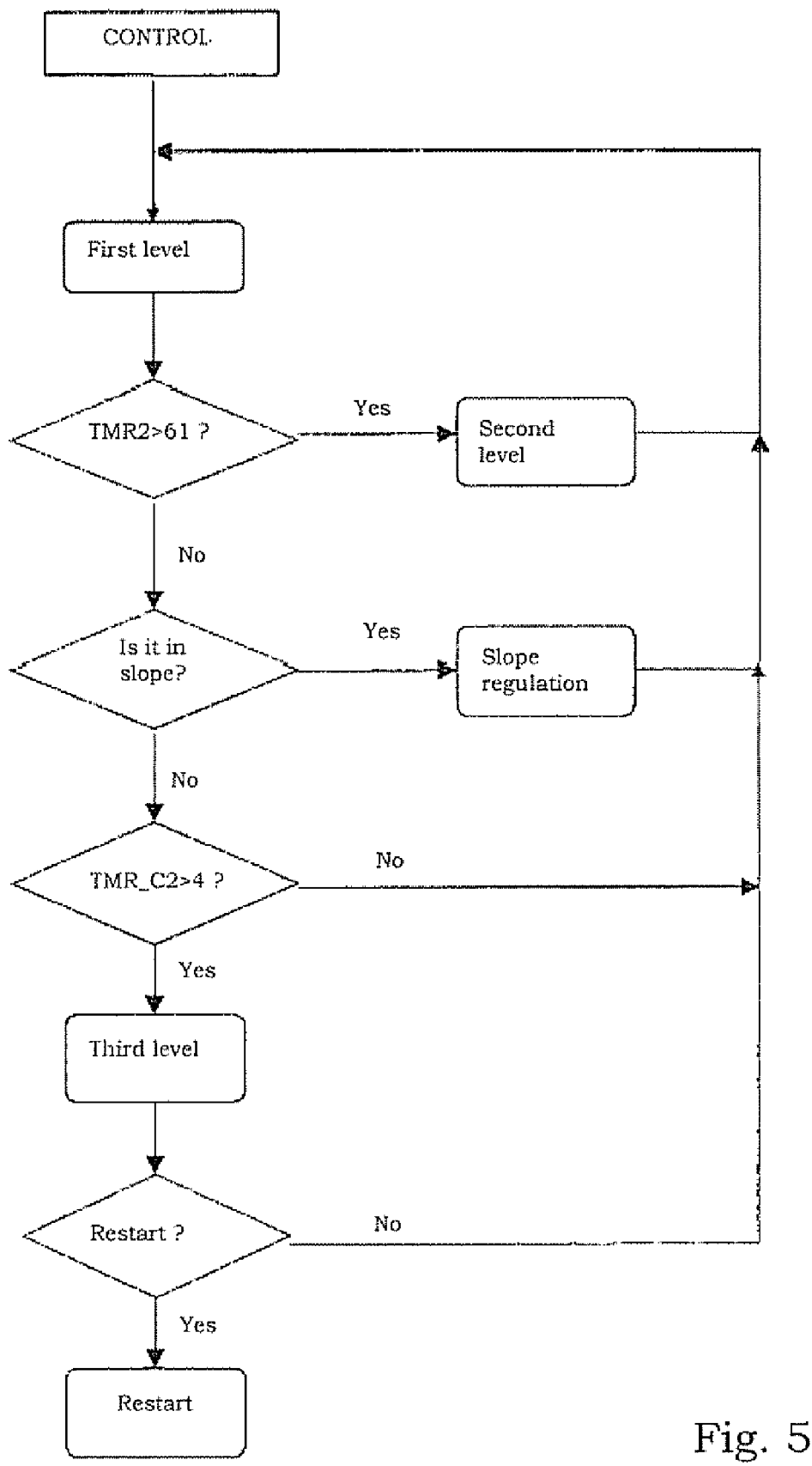
FIG. 5 is a flowchart showing in greater detail the control method according to the invention.

As shown in FIG. 3, a current regulation circuit is schematically shown with the numeral reference 30 including active elements forming a bridge structure with IGBT transistors. As previously seen, the instantaneous voltages supplied to the motor windings L1, L2 depend on the bus voltage value $V_{bus}$ and on the terminal voltage VMV of bridge centre, i.e. of the voltage that is in bridge 24 centre.

These two voltages are relatively independent from each other, in fact the bus voltage $V_{bus}$ has a capacitor charge/discharge form with a dominant fixed-frequency component (typically 100 Hz with 50 Hz mains power supply) while the voltage VMV of bridge centre has slower variations and depending (in frequency, in phase and in amplitude) on the winding current and thus on the power supply frequency imposed to the motor.

The two instantaneous voltages supplied to the windings are then:

$V_{bus}$–VMV

VMV.

If this variations are not taken into consideration, it may happen that, for the same theoretical voltage reference, the voltages applied to the two windings, for example in correspondence with the relevant maximum, are different, and then also current modules will be different with the subsequent repercussions on noise, ripple or torque ripple, dissipations (tending to become asymmetrical) and system instability.

The control method according to the invention takes this aspect into consideration providing to add or subtract a corrective term to voltage references, using a PID regulator whose coefficients are set on the basis of experimental data concerning the kind of load being applied to the motor. Therefore, the voltage applied to the windings by turning IGBT transistors on and off is kept constant at the desired value.

Based on the above, the amplitude of the minimum ripple $V_r$ to which the bus voltage sets as a consequence of the power control performed is strictly dependent on the load entity and thus on the flow rate and on the head of the pump. Power is thus essentially supplied as a function of the load.

On the basis of the right measure of the ripple amplitude in the bus voltage $V_r$, the mechanical load level, and particularly the flow rate, can thus be approximately set. If the flow rate increases, supposing of keeping the head constant for the same motor rotation frequency, a limit operating condition of the synchronous motor is reached, with subsequent pitch loss and motor shutdown. The motor control algorithm provided by the method of the present invention when a limit operating condition approaches adjusts adaptively the motor rotation frequency and it reduces it so enough as to keep the synchronous motor rotating with the lowest performance reduction with reference to the flow rate-head curve.

The relation between mechanical load, amplitude of the ripple $V_r$ and average bus voltage level is drawn from a predetermined table based on experimental trials for each specific application.

Let's now consider another way of estimating the mechanical load entity is the detection of the zero crossing of the signal $V_{bus}$–2*VMV, and the measure of the phase displacement between this last signal and the motor winding supply voltage. This phase displacement is proportional to the so-called load angle. In fact this signal, of the sinusoidal type, from the phase point of view is strictly linked to the winding currents and thus also to the motor load angle.

An increase of the mechanical load level causes an increase of the absorbed active power and thus a decrease of the time distance between the voltage and current zero crossings on each phase. Mechanical performances are modulated on the basis of a predetermined table, varying the frequency, in order to obtain the above-described advantages.

Possible rotor shutdown conditions, which might happen for several reasons, are set by the control method according to the invention on the basis of the module of the $V_{bus}$–2*VMV signal.

This signal undergoes a sharp amplitude increase in shutdown conditions. By setting convenient thresholds, variable on the basis of the winding current frequency and of the bus voltage average value, a discrimination is performed between the normal operation condition and the shutdown condition.

A problem of using the synchronous motor in the applications concerned by the present application consists in the instantaneous rotation shutdown (pitch loss) in case of load increase, case being already examined above, or in the supply voltage variation.

Also for this quantity the control method according to the invention provides a regulation being shown hereafter.

The highest bus voltage $V_{bus}$, which obviously depends on the mains voltage value, is measured; in case of decrease of this voltage $V_{bus}$ the motor rotation is reduced, thus decreasing the mechanical power supplied and the performances, but preventing the motor shutdown.

The maintained performances and the efficiency are however far higher than the corresponding application with asynchronous motor.

The control method according to the invention sets a supply voltage minimum threshold for the normal operation with real loads.

The block diagrams shown in the attached drawings 4, 5, 6 and 7 are now analysed in detail, which better show, by way of non limiting example, an application of the control method according to the invention.

Each flow chart of the FIGS. 4-8 reports a phase of the control method of the present invention.

It may be appreciated that the ripple voltage Vr is evaluated for a minimum power control thus regulating the voltage applied to the motor windings.

The ripple voltage Vr is also evaluated for detecting unacceptable loads for a possible frequency regulation or for stopping the motor.

The voltage value Vbus is evaluated in case of too low voltage values, thus providing a frequency regulation.

Figure 7:
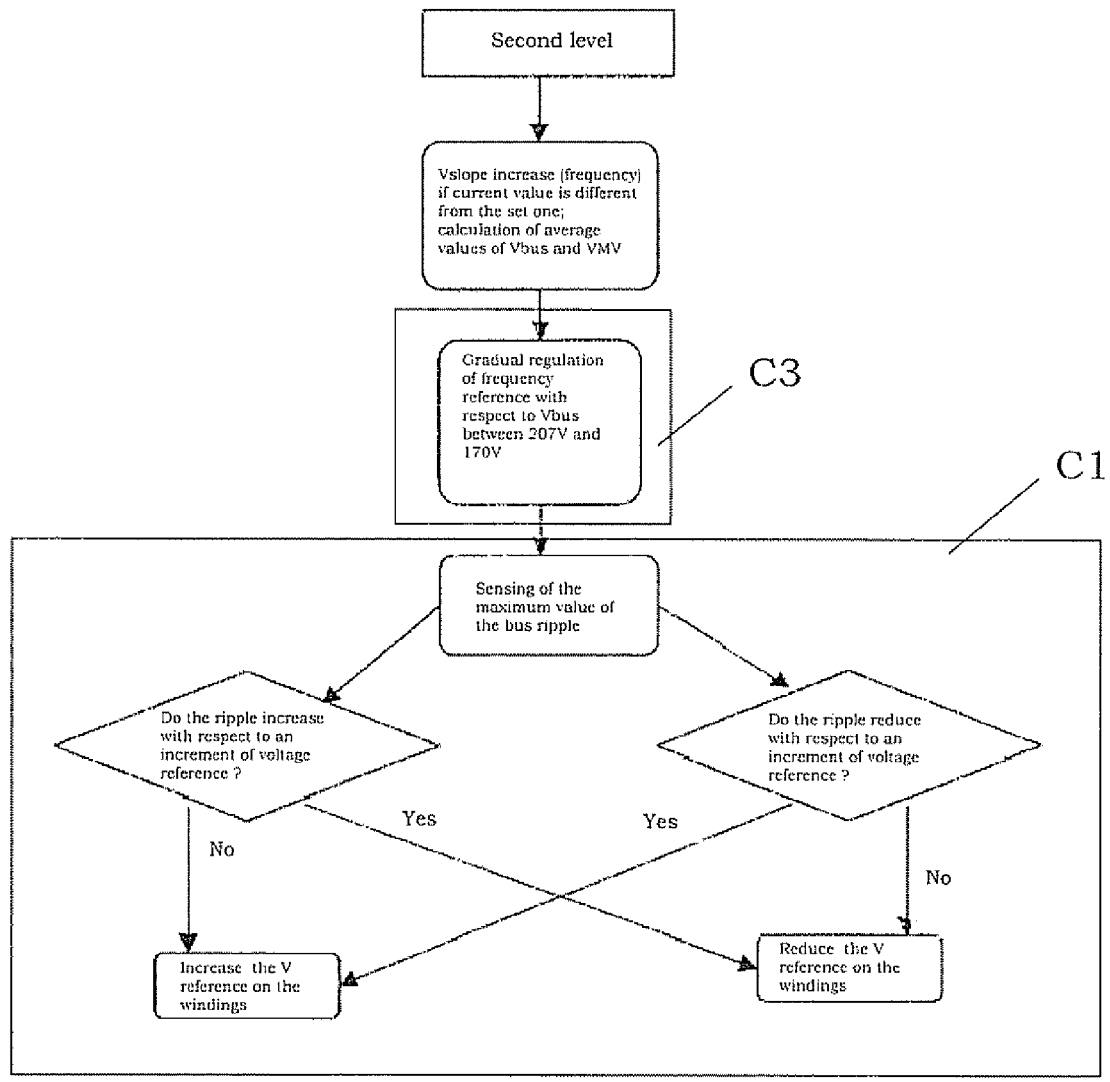
FIG. 7 is a block diagram showing some operative steps of a second detail of the flowchart of FIG. 5.
Figure 8:
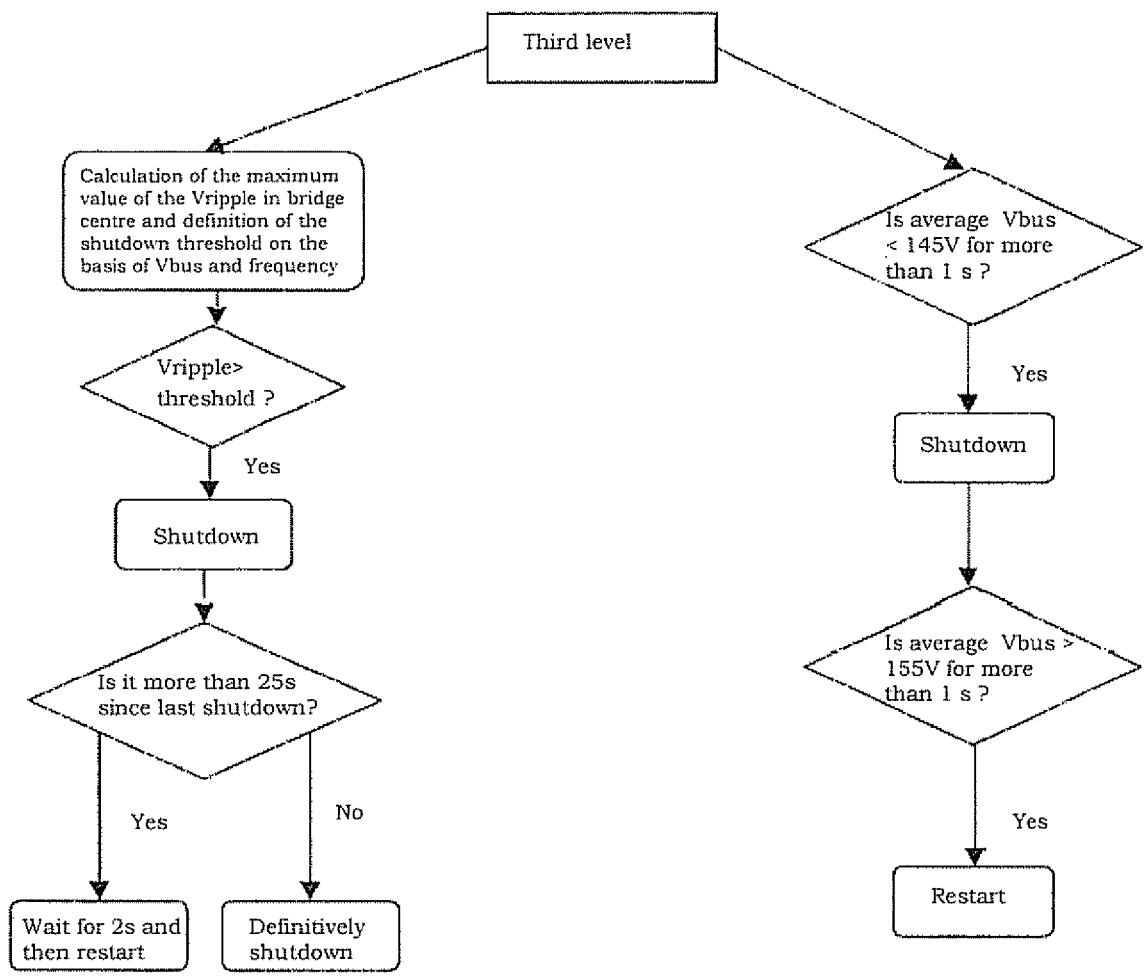
FIG. 8 is a block diagram showing some operative steps of a third detail of the flowchart of FIG. 5.

A clear correspondence between the control blocks C1 and C3 of FIG. 1 is reported in FIG. 7.

After all, the functions implemented by the control method according to the invention are:
power regulation,
sinusoidal current regulation,
regulation according to the required hydraulic load,
detection of a rotor shutdown condition,
protection against undervoltage,
modulation of hydraulic performances according to the line voltage.

The main advantage achieved by the circuit and method for controlling a synchronous electric motor, particularly for fluid circulation pumps in conditioning systems and/or household appliances such as washing machines and the like, is to make the operation of the electric motor itself unusually silent.

The control circuit of the invention, using a two-phase synchronous electric motor of the type described for example in European patent applications no. 1 105 961 and no. 1 281 229 to the Applicant, has currents being always equal and with 90° phase displacement, right because of the current regulation circuit and of the software generation of the operating time ranges.

Another advantage of the control circuit and method of the invention is the performance constancy when the temperature and flow rate vary within a wider operating range than the present prior art.

Another advantage of the control circuit and algorithm claimed by the present invention is that it does not require sensors effective to detect the rotor position determining a typically sensorless motor control.

Finally, advantageously according to the invention, the motor is driven by varying the winding voltage frequency, the latter having a sinusoidal wave form.

The invention claimed is:

1. Method for controlling a synchronous electric motor, particularly for fluid circulation pumps in conditioning systems and/or household appliances, comprising a permanent-magnet rotor, and wherein the application of predetermined voltage values to each of the windings (L1, L2) of the motor is provided, by means of a converter control circuit (10), characterised in that it provides:
   - a continuous measure of the amplitude of the bus ($V_r$) ripple;
   - a comparison with a reference value of said bus ($V_r$) ripple and the calculation of the variation amount with respect to said reference value;
   - a subsequent variation of the voltage (V) applied to the motor windings (L1, L2) as a function of said variation amount thus obtaining a minimum current absorption by the motor.

2. Method according to claim 1, characterised in that said variation of the winding voltage is related to the amount of the load and thus to the flow rate or head of the pump.

3. Method according to claim 1, characterised in that, when limit operation conditions approach, the motor rotation frequency is adjusted adaptively by reducing the rotation speed but keeping the synchronous motor rotating with a minimum performance reduction with reference to the flow rate-head curve.

4. Method according to claim 1, characterised in that the measure of the amplitude of bus ($V_r$) ripple is estimated with reference to a corresponding absorbed current decrease.

5. Method according to claim 1, characterised in that the motor control is sensorless and it lacks sensors effective to detect the rotor position.

* * * * *